(12) United States Patent
Whittenberger et al.

(10) Patent No.: US 10,821,415 B2
(45) Date of Patent: Nov. 3, 2020

(54) METHODS AND TOOLS FOR INSTALLING REACTOR COMPONENTS

(71) Applicant: Johnson Matthey Public Limited Company, London (GB)

(72) Inventors: William Alan Whittenberger, Ravenna, OH (US); Joseph W. Whittenberger, Ravenna, OH (US); Frank James Podojil, III, Ravenna, OH (US)

(73) Assignee: Johnson Matthey Public Limited Company, London (GB)

( * ) Notice: Subject to any disclaimer, the term of this patent is extended or adjusted under 35 U.S.C. 154(b) by 370 days.

(21) Appl. No.: 15/602,673

(22) Filed: May 23, 2017

(65) Prior Publication Data

US 2017/0333865 A1    Nov. 23, 2017

Related U.S. Application Data

(60) Provisional application No. 62/340,105, filed on May 23, 2016.

(51) Int. Cl.
| | | |
|---|---|---|
| *B01J 19/24* | (2006.01) | |
| *G01L 19/08* | (2006.01) | |
| *B01J 19/00* | (2006.01) | |
| *B01J 19/32* | (2006.01) | |

(52) U.S. Cl.
CPC ....... *B01J 19/2415* (2013.01); *B01J 19/2485* (2013.01); *G01L 19/086* (2013.01); *B01J 19/0053* (2013.01); *B01J 19/32* (2013.01); *B01J 2219/00018* (2013.01); *B01J 2219/2441* (2013.01); *B01J 2219/2496* (2013.01)

(58) Field of Classification Search
CPC ............... B01J 19/2415; B01J 19/2485; B01J 2219/2441; B01J 2219/2496; B01J 19/32; B01J 19/0053; B01J 2219/00018; G01L 19/086
See application file for complete search history.

(56) References Cited

U.S. PATENT DOCUMENTS

| | | | | |
|---|---|---|---|---|
| 5,037,955 A | * | 8/1991 | Dighton | B01J 19/2415 159/2.1 |
| 2004/0129092 A1 | * | 7/2004 | Dietzel | F16L 41/008 73/865.9 |
| 2006/0236867 A1 | * | 10/2006 | Neary | B01D 53/0415 96/121 |

(Continued)

FOREIGN PATENT DOCUMENTS

EP    2140933 A1    1/2010

*Primary Examiner* — Lawrence Averick
(74) *Attorney, Agent, or Firm* — Kevin M. Carroll

(57) ABSTRACT

An installation tool for installing reactor components into a reactor is disclosed. The tool comprises a housing having a first end and a second end opposite the first end; a releasable attachment assembly for securing a reactor component support to the tool, the attachment assembly being pivotably inside the housing; a gas supply hose connected to the first end of the housing; and a gas outlet at the second end of the housing in fluid communication with the gas supply hose. The gas outlet is configured to provide gas to expand a reactor component secured by the releasable attachment assembly. A control line for the releasable attachment assembly runs inside the gas supply hose.

8 Claims, 2 Drawing Sheets

(56) References Cited

U.S. PATENT DOCUMENTS

| | | | |
|---|---|---|---|
| 2006/0245982 A1* | 11/2006 | Whittenberger | B01J 19/2495 422/148 |
| 2011/0130607 A1* | 6/2011 | Kolios | B01J 19/2485 585/443 |
| 2013/0291383 A1 | 11/2013 | Whittenberger et al. | |
| 2014/0150531 A1* | 6/2014 | Ball | G01M 3/022 73/40.5 R |
| 2014/0325843 A1* | 11/2014 | Whittenberger | B01J 19/0053 29/890 |
| 2014/0356109 A1 | 12/2014 | Whittenberger | |

* cited by examiner

METHODS AND TOOLS FOR INSTALLING REACTOR COMPONENTS

FIELD OF THE INVENTION

The present invention relates to methods of installing reactor components and the tools used to perform the same, and in particular, to installation tools for installing reactor components such as structured catalysts suitable for use in a reactor tube.

BACKGROUND

Reactor components for carrying out catalytic reactions, such as those used to produce syngas or hydrogen, can generally contact reactor tubes exposed to a heat source, for example a furnace, to support reactions. In contrast, other types of reactions, such as exothermic reactions, can require a cooling source, such as a cooling jacket. The reactor tubes can be loaded with various arrangements of catalyst-coated components, such as foil-supported or structured catalysts in the form of fans, fins, coils, foams, or monoliths. In some instances, the reactor catalyst-coated components can be expandable, such as those formed from foil, for example, a fan. The reactor components are typically supported in sets of one or more components on a support. For example, the components may be stacked around an expandable center arrangement, which in turn comprises a, usually central, support.

To improve heat transfer and fluid flow through a reactor, the fit of foil-supported catalysts can be enhanced. In a reactor tube, expandable catalyst-coated reactor components can be positioned to increase heat transfer, such as being in contact with or in a controlled proximity to the reactor wall exposed to a heating or cooling source. Thus, it is desirable to fit reactors with accessories to promote increased heat transfer and reactor efficiency, such as features that create turbulent and/or impingement fluid flow through the reactor components. The reactor installation tools described herein can be used with any style of reactor, such as a cylindrical-shaped tube reactor. Reactor components can occupy substantially all of the space within a reactor tube and/or press firmly against the interior wall of the reactor tube. Installation of reactor components can cause damage, such as denting portions of the reactor tube or other components, for example, the fins of a reactor. Thus, there is a need to install reactor components in a reactor tube with a tool that avoids damaging the reactor components or tube.

Installing reactor components involves the reactor being shut down. There is a desire to improve the installation efficiency so as to minimise the downtime. There is thus a need for simpler, more efficient installation tools that reduce the risk of complications and are easier to use.

US20140325843 describes reactor installation tools and methods for installing reactor components in a reactor tube. However, there is a need for simpler, more compact, more user-friendly tools and methods that can reduce installation times and further improve installation reliability.

Preferred embodiments of the present invention seek to overcome one or more of the above disadvantages of the prior art. In particular, preferred embodiments of the present invention seek to provide improved reactor installation tools and methods of installing reactor components.

SUMMARY OF INVENTION

According to a first aspect of the invention, there is provided an installation tool for installing reactor components into a reactor, the tool comprising: an outer housing having a first end and a second end opposite the first end; a releasable attachment assembly for securing a reactor component support to the tool, the attachment assembly being mounted inside the housing; a gas supply hose connected to the first end of the housing; and a gas outlet at the second end of the housing in fluid communication with the gas supply hose, wherein the gas outlet is configured to provide gas to expand a reactor component secured by the releasable attachment, assembly and wherein a control line for the releasable attachment assembly runs inside the gas supply hose.

The tool of the invention therefore provides a tool in which the user only has to handle the gas supply hose. By running the control line for the releasable attachment assembly inside the gas supply hose, the possibility for tangling or twisting of multiple separate hoses is removed. Moreover, the operator only has to let out or gather in a single hose, which is a simpler operation to perform.

Prior art tools have typically had multiple lines running to the tool. The lines can tangle and snag and it is therefore advantageous to run the control lines within the gas supply hose. Preferably the gas supply hose is used to suspend the tool and the reactor component during insertion of the reactor component into the reactor. The reactor is typically a vertical tube and the tool, with the reactor component attached is preferably lowered into the reactor tube by the gas supply hose. The gas supply hose is preferably configured to support the weight of the installation tool. Prior art tools have typically included a separate rope or cable to suspend the tool. The inventors have appreciated that using a suitable gas supply hose to suspend the tool simplifies the design and operation of the tool, thus reducing the manufacturing cost and installation time. Using a suitable gas supply hose to suspend the tool removes the need for the support rope or cable of prior art systems, advantageously removing the risk of that support rope or cable tangling with the gas supply hose. Preferably the gas supply hose has length markings on its outer surface. In that way the gas supply hose can also be used to measure the position of the reactor component during the installation. While it may be possible to lower the component into the reactor until it comes to rest on the component below, it may be necessary to confirm that the component is indeed resting on the component below, and not stuck at another point in the reactor. By providing the means of measurement on the gas supply hose the cost of the installation tool is reduced and the operation of the tool is simplified. In prior art tools any tape measure would typically be attached separately from the gas supply hose, separately from the support rope or cable and separately from the control lines. Thus prior art tools may involve four or more lines, which can tangle with each other and/or get caught on items. By running the control lines inside a gas supply hose that can support the weight of the tool and putting length markings on the outside of the gas supply hose, the present invention provides all the functionality of the prior art in a single line. That can greatly simplify the operation of the tool and remove the risk of tangling or snagging.

Preferably more than one control line runs within the gas supply hose. Most preferably, all of the control lines for the installation tool run within the gas supply hose. Preferably the gas supply hose also acts to suspend the installation tool. Thus the only line running from the tool to the user is preferably the gas supply hose. The gas supply hose may thus be said to be a single umbilical.

Preferably the tool comprises a pressure sensor to measure the pressure within the housing. Preferably the pressure sensor comprises a sensing hose which runs within the gas supply hose. The sensing hose may run from within the housing, through the gas supply hose, to a pressure sensor, for example a pressure sensor in a control cabinet for the tool. Preferably the sensor records the pressure over time, either locally in the tool or remotely by sending readings to a controller. The readings may be sent via a control line in the gas supply hose to a control cabinet for example. Preferably the controller and/or the operator analyses the pressure signal produced to determine whether the component has been correctly installed by the pressurised gas blast. Analysis by the controller may be particularly advantageous as it may provide a real time or near real time indication of the success or otherwise of the installation. For example, the controller may be configured to analyse the pressure signal, determine the success of the installation and indicate the success or otherwise, for example by operating a visual or audio indicator. The controller may also log the pressure signal and/or the result of the analysis for future use. Examples of analysis that may be carried out to determine the success or otherwise of the installation include comparing the peak pressure to a pre-determined threshold. If the peak pressure does not reach the expected threshold, a leak path may have existed that prevented the blast from creating sufficient pressure to fully expand the component. As another example, the expansion of the component as the pressurised gas is supplied will create a distinctive shape on the pressure wave. The shape of the wave, or characteristics of that shape, may be compared with the shape or characteristics of a calibration or calculated wave to determine whether or not the installation has proceeded as expected. For example, a strong increase in pressure followed by a sudden drop may indicate that a component has resisted expansion and been damaged.

Preferably the attachment assembly is pivotably mounted inside the housing. The tool of the invention therefore provides a tool that is simple to manufacture, but which reduces the risk of damage when reactor components are installed in the reactor. In particular, where there is reduced clearance above the reactor, the reactor components can be pivoted relative to the tool to allow them to be inserted into the top of the reactor. Preferably the pivotable mount can be locked. Thus, in situations where there is plenty of clearance, the components can be more securely attached to the tool.

The tool can grip the reactor component support during insertion and then supply a blast of pressurised air to expand the component. The support may be part of the reactor component or a separate support, such as an expandable center arrangement, on which the component is supported. Blasts of air are used to expand the reactor components so as to place them in the correct position, for example by expanding an expandable center arrangement that in turn forces the reactor components to expand. In particular, the component can be inserted in a collapsed (i.e. non-expanded) configuration and then expanded in-situ in the reactor. Thus a component that is a tight fit in the reactor can be installed without having to force the component into the reactor.

Preferably the tool comprises a seal assembly mounted on the second end of the housing and the gas outlet is configured to provide gas to expand the reactor component via the seal assembly. The seal assembly is preferably mounted on the second end of the housing by a twist-lock. The seal assembly may need replacing from time to time and it is therefore advantageous to have a quick-release twist-lock system. Moreover, a particularly efficient installation method involves a single tool and multiple seal assemblies. The seal assemblies can be mounted on the reactor components and then each reactor component, with the seal assembly already attached can be attached to the tool and gripped by the attachment assembly, preferably in a single step. The reactor component is then installed and the tool withdrawn from the reactor with the seal assembly still attached. The seal assembly can be removed and another component, with another seal assembly already attached, can be attached to the tool. The quick release nature of the twist-lock system allows this process to be carried out, very efficiently, resulting in quicker installation times. The method may for example involve one tool and two, or more, seal assemblies. While one reactor component is being installed using one seal assembly, a second seal assembly can be attached to the next reactor component when the next component is being installed the first seal assembly, or a third seal assembly, can be attached to another reactor component and so on. The twist-lock may provide an easier quick release system than a threaded or clamped connection.

According to a second aspect of the invention, there is provided a method of installing a reactor component in a reactor, the method comprising: releasably attaching a reactor installation tool to a support of the reactor component; inserting the reactor component into the reactor, wherein the reactor installation tool is suspended from a gas supply hose as the reactor component is inserted into the reactor; supplying pressurised gas to expand the reactor component via the tool; disengaging the tool from the reactor component; and removing the tool from the reactor. Preferably the installation tool comprises a releasable attachment assembly, wherein a control line for the releasable attachment assembly runs inside the gas supply hose. As discussed above, the provision of a gas supply hose which contains the control lines and which suspends the tool results in a simpler tool, which is quicker and more efficient to operate.

Preferably the gas supply hose has length markings on its outer surface and the position of the reactor component is monitored using the length markings as the reactor component is inserted into the reactor.

Preferably the reactor component pivots relative to the installation tool during the insertion. The pivoting of the component relative to the tool during the insertion may advantageously allow the component and tool to deflect from the centerline to pass obstacles such as hangers. The pivoting there may be particularly advantageous where there is reduced clearance above the reactor.

Preferably a pressure in the tool or the reactor component is monitored as the pressurised gas is supplied. Preferably the method further comprises determining information about the installation of the reactor component using the monitored pressure. In some embodiments, if a maximum pressure does not exceed a pre-determined threshold pressure, the reactor component is determined to not be correctly installed. In some embodiments the reactor component is determined to be correctly installed based on a comparison of a characteristic of a measured pressure wave with a characteristic of an expected pressure wave. The validation of the installation in that way may advantageously improve the lifetime of the reactor components. For example, the analysis of the pressure indicates that the component has not expanded properly, remedial action may be taken to prevent hot spots developing in that component leading to premature failure of the component. The remedial action may for example involve removal and re-installation of that component. Real time or near real time analysis may be particularly advantageous of that as it is easier to replace the component before the remainder of the components are installed on top of it.

The reactor may be a tubular reactor having a tube opening for exposing the interior region of the reactor and reactor components contained therein. The tool may have dimensions and a diameter less than the reactor tube opening such that the tool can be inserted into the reactor tube. The tool can include a spacer ring located at the end of the tool for insertion into the tube wherein the outer diameter of the spacer ring is preferably slightly less than the inner diameter of the reactor tube. The spacer ring advantageously aids in guiding the tool in the reactor tube and is preferably made of plastic or other non-metal material to avoid damaging the interior region of the reactor or components located therein.

For securing the tool to a reactor component support, the reactor installation tool includes a releasable attachment assembly, preferably near the second end. The releasable attachment assembly is preferably a ball-lock, but may include two or more gripping jaws for securing the support, such as a support for holding reactor components. For instance, the attachment assembly may secure the tool to a reactor stack composed of at least a support holding one or more reactor components stacked on the support. The tool can be lowered into a reactor tube along with the reactor sleeve for installing and positioning the reactor components in the reactor tube. Alternatively, the reactor sleeve can be positioned in the reactor tube and the tool can be lowered into the reactor for a blind attachment to the support.

Preferably the attachment assembly can be actuated with the use of compressed gas or mechanical force, such as by hand force. Thus the control line may for example be a compressed gas line or a cable for transferring mechanical force. For instance, the attachment assembly can be connected by a wire to a trip mechanism for releasing support. In a preferred embodiment, the releasable attachment assembly can include a ball-lock device such as a shaft collar, for example those manufactured by QuikLoc. A ball-lock device can be particularly useful for securing the tool to a support that has an end with a protruding round shaft wherein the ball-lock device can slide over the shaft to lock the tool to the support and then subsequently be released to remove or detach the tool from the support, for example, by lifting up on the device. Preferably the ball-lock is actuated by compressed gas from a compressed gas control line. For example the compressed gas control line may be a small hose running within the gas supply hose.

The seal assembly preferably comprises a flexible seal for engaging an interior region of the reactor. Preferably, an end of the seal flexes to cover an open interior region of the reactor such that the open interior region is exposed to the compressed gas outlet of the reactor installation tool and not to the atmosphere outside the reactor. By covering the open interior region of the reactor, the seal provides an isolated interior region that can be filled with compressed gas for purposes of positioning and expanding reactor components or the like. The interior region can be blocked at the opposite end of the reactor tube such that the seal closes the interior region. Thus, the compressed gas passed into the interior region from the tool is trapped or contained in the region due to the seal blocking or reducing the ability of the compressed gas from escaping into the atmosphere outside the reactor.

The flexible seal can be a flexible tube. In a preferred embodiment, one or more flexible tubes can be used to form the flexible seal. The tubes may be mounted on the seal assembly such that compressed gas from the gas outlet passes through a hole an the seal assembly into the tube. The multiple tubes can overlay one another. The one or more flexible tubes can have a frayed end. For example, a skirt seal made up of two or more frayed tubes can be used as the flexible seal. The tubes can be cut at multiple locations at one end so the end can fan out to provide a flat circular ring that extends outward from an intact end of the tube at an opposite end to the cut end. For example, the intact end may be mounted on the seal assembly, such as on or in the hole in the seal assembly. Two or more tubes having frayed ends can be used so the flat circular ring does not contain open holes or slots that permit compressed gas to escape from the interior region of the reactor. Depending on the nature and capacity of the compressed gas being discharged into the interior region, the seal need not be perfect and some gas can escape. The cuts can be equally spaced around the diameter of one end of the tube and any number of cuts can be made as desired. The cuts can extend along the tube any distance, for example, the cuts can extend along the tube to the point at which the tube is mounted on the seal assembly. The flexible nature of the seal, and the ability of the flexible end to expand into the cavity in the reactor, ensures the interior region is sealed even during movement of reactor components, such as radial expansion.

The tool includes a gas outlet. The gas outlet preferably discharges compressed gas into an interior region of the reactor. The gas outlet can be positioned to discharge the compressed gas through an opening in the seal assembly exposed to the interior region of the reactor. The gas supply outlet can be fed compressed gas from the gas supply hose via the housing.

In another embodiment, the tools described herein can be used to install reactor components in various tubular reactors. The method of installing a reactor component can include providing a reactor installation tool having a releasable attachment assembly capable of securing the tool to a reactor or a support located in an interior region of the reactor or outside the reactor tube. In the case the support is located outside the reactor tube, such as in the case of a support having a stack of reactor components ready for loading into a reactor tube, the reactor installation tool can be used to lower the support and reactor components into the reactor tube. Once the support and reactor components are in the reactor tube, and the tool is secured to the support the reactor installation tool can be used to position the components.

Positioning the components can include supplying compressed gas via the reactor installation tool to pressurise an interior region of the reactor containing the reactor components. For example the positioning may comprise delivering blasts of pressurised or compressed gas that can cause reactor components to move and/or expand into desired locations in the reactor tube. To deliver the compressed gas to pressurize an interior region of the reactor, the tool has a gas outlet in fluid communication with the gas supply hose. Compressed gas can be released into the interior region of the reactor thereby pressurizing the interior region and causing reactor components to expand in the radial direction towards the reactor tube wall. The released compressed gas can be at a pressure of 10 to 150 psi, and the interior region of the reactor can be pressurized to a pressure of 1 to 70 psi.

To ensure or help prevent compressed gas from escaping the interior region of the reactor, a seal can be used. The seal can be secured to the tool and one end of the seal can be flexible and extend into the reactor for engaging the reactor components and isolating the interior region from the atmosphere or area outside the reactor tube. Once the compressed gas is released into the interior region, either sealed with the seal or not, the reactor installation tool can be detached by releasing the releasable attachment assembly so the support is no longer being gripped.

It will be appreciated that features described in relation to one aspect of the invention may be equally applicable in another aspect of the invention. For example, features described is relation to the tool of the invention, may be equally applicable to the installation method of the invention, and vice versa. Some features may not be applicable to, and may be excluded from, particular aspects of the invention.

DESCRIPTION OF THE DRAWINGS

Embodiments of the present invention will now be described, by way of example, and not in any limitative sense, with reference to the accompanying drawings, of which.

DETAILED DESCRIPTION

Figure 1:
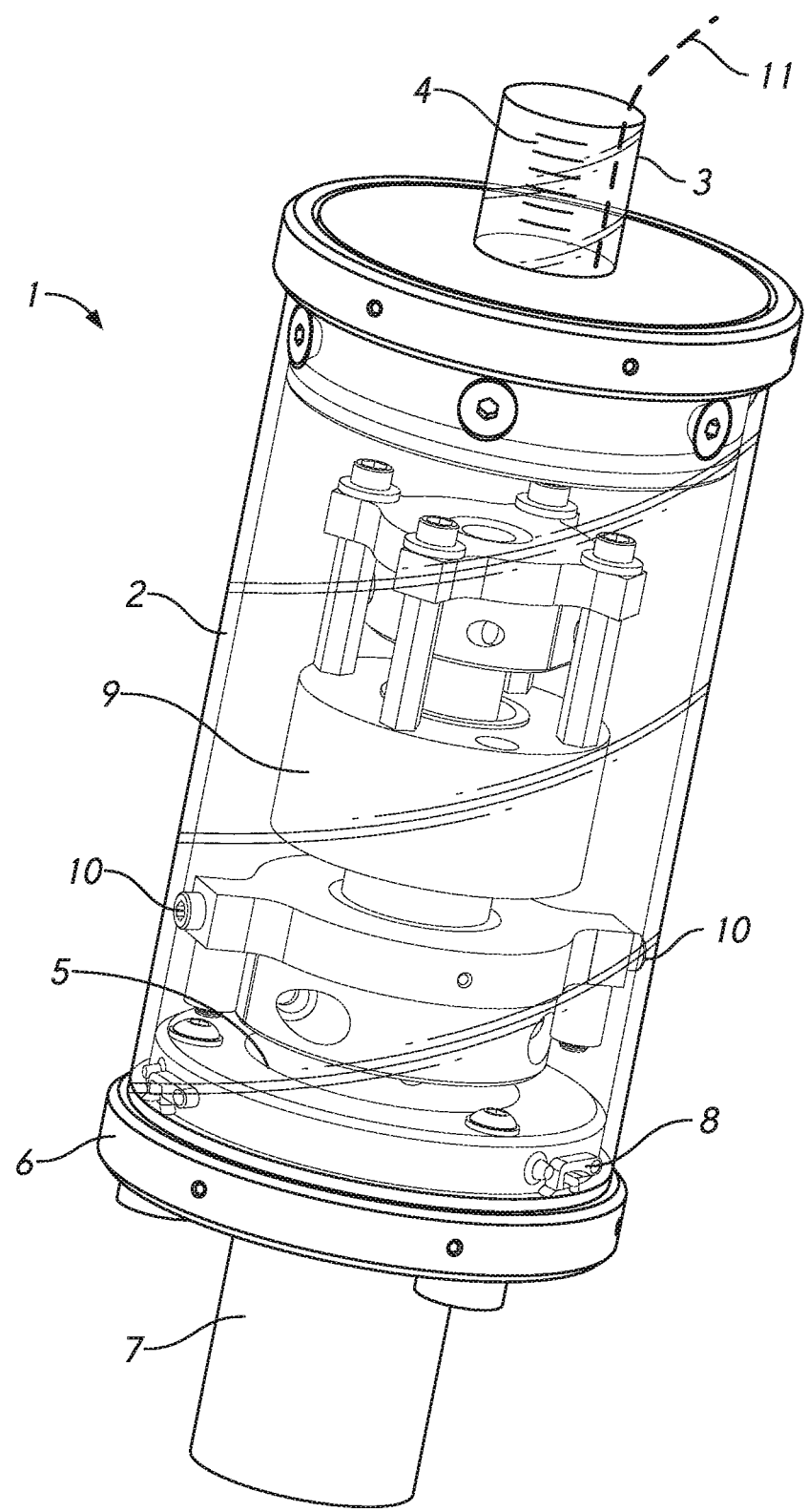
FIG. 1 is a view of part of an installation tool according to the invention.

In FIG. 1 an installation tool 1 comprises a housing 2. At a first end of the housing 2 a gas supply hose 3 is attached to the housing 2. The gas supply hose 3, of which only a short length is depicted in FIG. 1, comprises markings 4 of a length scale. The tool 1 further comprises a gas outlet 5. The gas outlet 5 is in fluid communication with the gas supply hose 3 via the interior of the housing 2. A seal assembly 6 is mounted on a second end of the housing 2 so that compressed gas exiting the gas outlet 5 passes through the seal assembly 6. The seal assembly 6 comprises a flexible seal 7, through which the compressed gas passes. The seal assembly 6 is mounted on the housing 2 by a twist-lock quick release 8. Inside the housing 2 there is a releasable attachment assembly in the form of a ball-lock actuated by an air cylinder 9. The ball-lock and air cylinder 9 are mounted to the housing 2 at pivot points 10 so that the ball-lock and air cylinder 9 can pivot relative to the housing 2. A control line 11 for the ball-lock and air cylinder 9 and a pressure sensing line (not shown) run inside the gas supply hose 3 to the tool 1. The pivot points 10 can be locked, for example in situations where there are no clearance issues.

Figure 2:
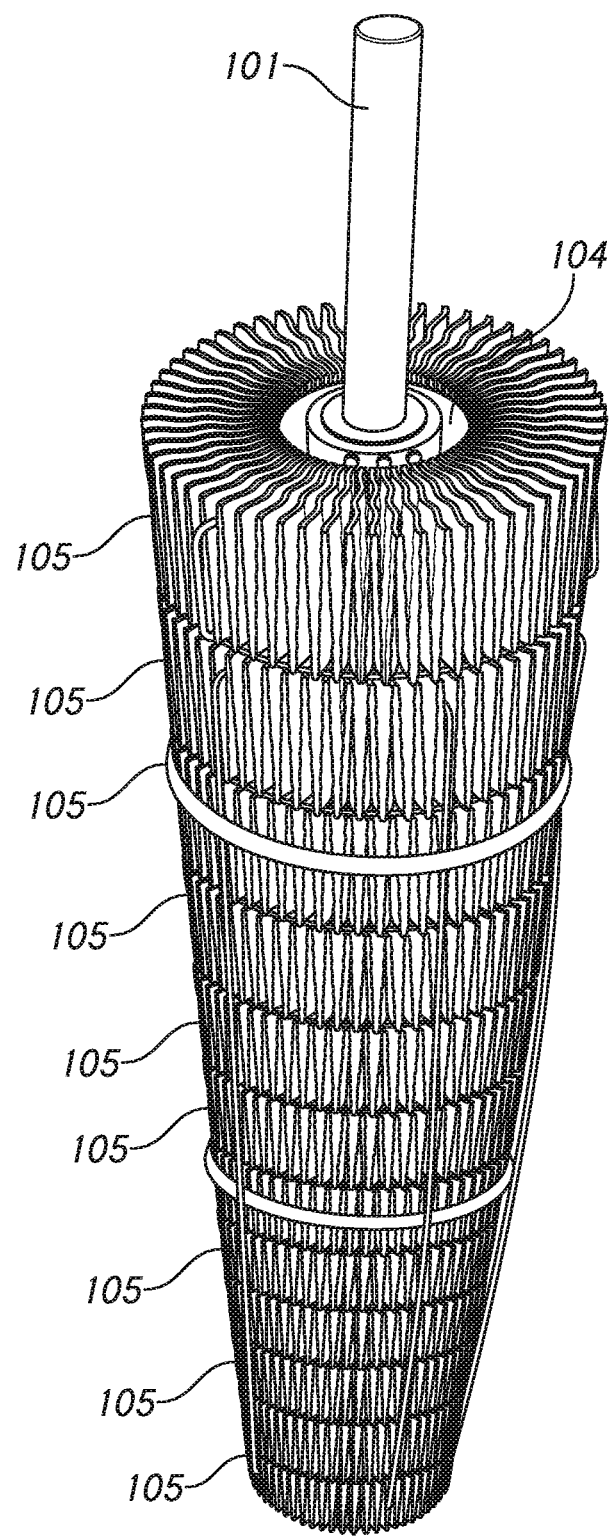
FIG. 2 is a view of reactor components ready to be installed by an installation tool or method according to the present invention.

In FIG. 2, multiple structured catalyst-coated components 105 are stacked around the outside of an expansion tube 104, which is mounted on a center support 101. The support 101 and the expansion tube 104 together form a center arrangement. During installation, the center arrangement with the structured catalyst-coated components 105 stacked around it is grasped by the installation tool 1, with the ball-lock engaging with the top of the center support 101. The tool 1, with the reactor components 105 attached is then lowered on the gas supply hose 3 into a reactor tube until the markings 4 on the gas supply hose 3 indicate that it has reached its desired location. If there are obstructions above the reactor tube, the components 105 and tool 1 can be maneuvered around them by the pivoting of the ball-lock relative to the housing 2. That can allow the tool 1 to deflect from the centerline of the reactor tube, while still gripping the center support 101. Once the components 105 are at their desired location in the reactor tube, compressed gas is supplied via the gas supply hose 3, through the housing 2, to the gas outlet 5. The gas passes through the gas outlet 5 and the flexible seal 7, which creates a seal with the inside of the reactor tube or with the expansion tube 104. The compressed gas forces the expansion tube 104 and the components 105 to expand so that the components 105 are pressed outwardly toward the wall of the reactor tube. A locking arrangement, for example spring elements, within the expansion tube 104 provides a biasing force that prevents the expansion tube 104 from collapsing once the compressed gas is no longer supplied. In preferred embodiments, during the supply of the compressed gas, the pressure in the tool is monitored and the resulting pressure profile analysed to determine whether it follows the expected profile for a successful installation. If the profile indicates a successful installation the ball-lock is released from the center support 101 using the control line 11 running within the gas supply hose 3 and the tool 1 is withdrawn from the reactor tube leaving the center support 101, expansion tube 104 and reactor components 105 in place. The tool 1 may then be attached to another center support 101 of another stack of reactor components 105, which are then installed on top of the recently installed stack. In preferred embodiments the seal assembly 6 is pre-attached to the stack and is attached to the housing 2 using the twist-lock quick release 8 as the center support 101 is grasped by the ball lock 9. More than one seal assembly 6 may be provided so that one can be mounted on a waiting stack, while another is in use installing a preceding stack.

It will be appreciated by persons skilled in the art that the above embodiments have been described by way of example only, and not in any limitative sense, and that various alterations and modifications are possible without departure from the scope of the invention as defined by the appended claims.

The invention claimed is:

1. An installation tool for installing reactor components into a reactor, the tool comprising:
    a housing having a first end and a second end opposite the first end;
    a releasable attachment assembly for securing a reactor component support to the tool,
    the attachment assembly being mounted inside the housing;
    a gas supply hose connected to the first end of the housing; and a gas outlet at the second end of the housing in fluid communication with the gas supply hose,
    wherein the gas outlet is configured to provide gas to expand a reactor component secured by the releasable attachment assembly and wherein a control line for the releasable attachment assembly runs inside the gas supply hose;
    wherein the installation tool comprises a seal assembly mounted on the second end of the housing and the gas outlet is configured to provide pressurized gas to expand the reactor component via the seal assembly.

2. An installation tool according to claim 1, wherein the seal assembly is mounted on the second end of the housing by a twist-lock.

3. An installation tool according to claim 1, wherein the tool comprises more than one control line running inside the gas supply hose.

4. An installation tool according to claim 1, wherein the attachment assembly is pivotably mounted inside the housing.

5. An installation tool according to claim 1, wherein the gas supply hose has length markings on its outer surface.

6. An installation tool according to claim 1, wherein the tool comprises a pressure sensor to measure the pressure within the housing.

7. An installation tool according to claim 6, wherein a sensing hose runs inside the gas supply hose.

8. An installation tool according to claim 1, wherein the gas supply hose is configured to support the weight of the tool.

* * * * *